ized to the desired depth by the preserva-
UNITED STATES PATENT OFFICE.

ALBERT N. CHAMBERS, OF MARTIN, TENNESSEE, ASSIGNOR OF ONE-HALF TO JAMES L. GODFREY, OF MARTIN, TENNESSEE.

PROCESS OF PRESERVING MEATS.

997,179.  Specification of Letters Patent.  Patented July 4, 1911.

No Drawing.  Application filed June 7, 1910.  Serial No. 565,425.

*To all whom it may concern:*

Be it known that I, ALBERT N. CHAMBERS, a citizen of the United States, residing at Martin, in the county of Weakley and State of Tennessee, have invented new and useful Improvements in Processes of Preserving Meats, of which the following is a specification.

This invention relates to a process of preserving cured or pickled meats against the ravages of insects, the object of the invention being to provide a process and composition of matter to avoid and prevent the attacks of insects which deposit their eggs upon the meat and produce what are commonly known as "skippers", which infest the meat and entirely unfit it for consumption.

In carrying my invention into practice, the meat to be treated is first pickled or cured in any preferred way, and then subjected to the action of my improved compound in a prescribed manner, which must be followed out in order to secure the best results. This compound or composition of matter consists, essentially, of the following ingredients in about the quantities specified, to wit:—

| | |
|---|---|
| Cayenne pepper | 1 part. |
| Saltpeter (nitrate of potash) | 1 part. |
| Borax | 18 parts. |

The solution is first prepared by dissolving one-half of the total amount of the compound to be used in a sufficient amount of water to entirely submerge the piece of meat to be treated, which water is first heated to the boiling point and the composition then dissolved therein. The meat is then submerged for a sufficient length of time in the solution to allow the latter to partially penetrate the same, after which the meat is removed and the remainder of the compound sprinkled or spread over the surface of the same, and the meat then hung up to dry.

As a result of this method of treatment, a sufficient amount of the compound is deposited upon the surface of the meat to prevent the attacks of insects under all conditions. If, however, through handling or other causes the surface layer of the composition should be removed, the remainder of the compound taken up or absorbed by the meat will operate to destroy all insects and their larvæ which may alight upon and attack the meat.

The composition employed has been found highly efficient for its intended purpose, aids in preserving and preventing decomposition of the meat, and does not in any manner impair or unfit the meat for human consumption. While primarily intended for protecting and preserving hog meat and pork, it may also be employed for preserving and protecting other cured meats.

Having thus described my invention, I claim:—

The herein-described method of preserving and protecting meats against decay and the ravages of insects, which consists essentially in first curing or pickling the meat, then preparing a dry preservative composition of cayenne pepper, 1 part, saltpeter, 1 part, and borax, 18 parts, then dissolving a portion of the total amount of the composition to be used in a sufficient amount of boiling water to cover the piece of meat to be treated, then submerging the meat in the solution thus produced until it is impregnated to the desired depth by the preservative solution, then removing the meat from the solution, then applying the remainder of the dry composition to the surface of the meat, and then allowing the latter to dry.

In testimony whereof I affix my signature in presence of two witnesses.

ALBERT N. CHAMBERS.

Witnesses:
R. M. JOHNSON,
IRA L. RICE.